Sept. 4, 1934.  A. J. SHELDON  1,972,668
COMBINED WALKING STICK AND SEAT
Filed Aug. 11, 1933  2 Sheets-Sheet 1
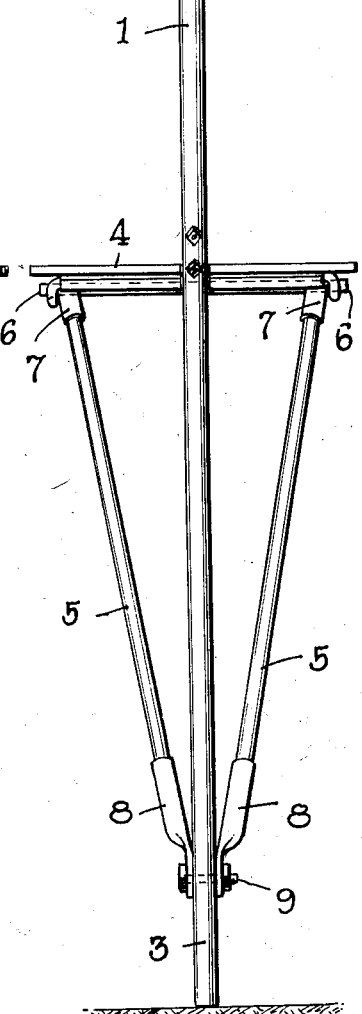

Sept. 4, 1934.  A. J. SHELDON  1,972,668
COMBINED WALKING STICK AND SEAT
Filed Aug. 11, 1933  2 Sheets-Sheet 2
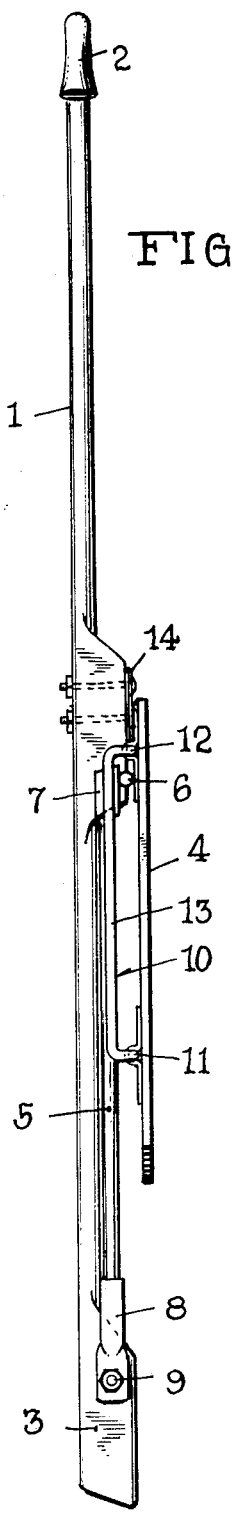
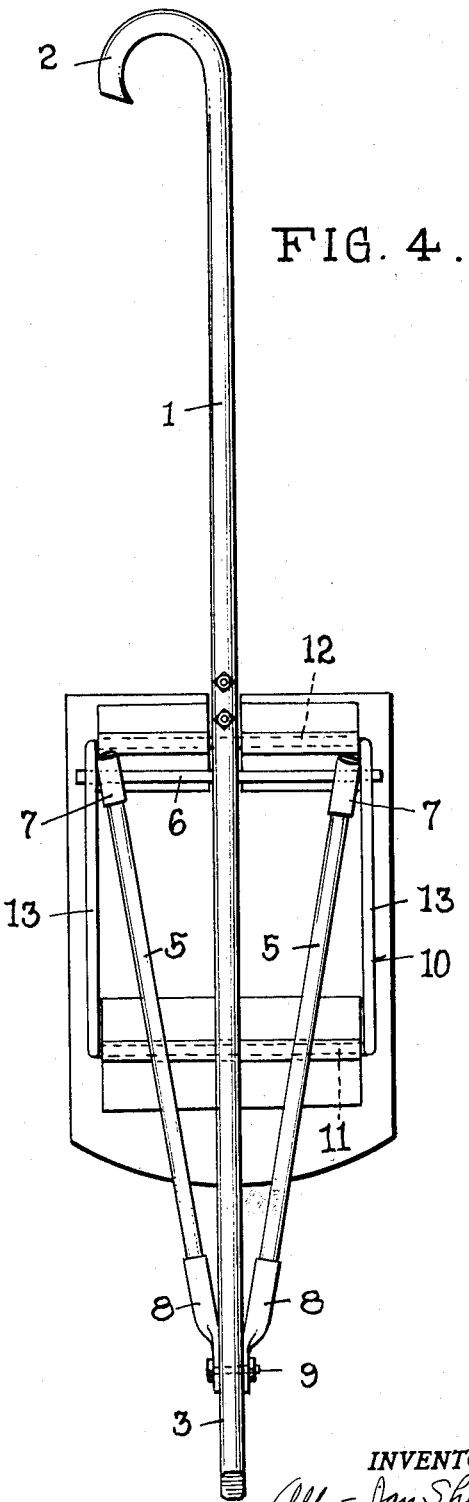

Patented Sept. 4, 1934

1,972,668

UNITED STATES PATENT OFFICE 1,972,668

COMBINED WALKING STICK AND SEAT

Albert Jay Sheldon, Willsboro, N. Y.

Application August 11, 1933, Serial No. 684,713

5 Claims. (Cl. 155—135)

My invention comprises a combined walking stick and seat.

More specifically the invention is a device including folding parts adapted to be opened to provide a temporary rest or seat, and adapted to be closed to cause the device to occupy a minimum of space and to permit it to be used as a walking stick or cane.

The device has been found to be especially useful by persons in ill health, i. e., invalids, convalescents and the like who are able to walk to some extent but who tire easily and find it necessary frequently to rest in places where no chair or permanent seat may be located. The subject of this invention is a portable seat or rest which when carried about in its folded position provides all the walking support afforded by a walking stick or cane, and which when opened to its expanded form constitutes a seat or rest capable of supporting the user in a comfortable sitting posture for as long a period as may be desired.

The present device has also been found useful by spectators at parades, sporting events, and the like, and by hikers, picnickers, etc., where the necessity of standing and walking for long periods of time makes it desirable to rest in a sitting position whenever possible. My present invention may be carried by the latter class of users with no more inconvenience than is required to carry the ordinary walking stick, and the device affords all the assistance and support during walking that the usual simple walking stick provides, and in addition it gives, whenever desired, sitting support equivalent to that afforded by the ordinary type of camp stool.

Among the advantages of the invention are its compactness when folded, its light weight, its simplicity of structure and operation, its strength and capacity to support persons of considerable weight, and the low cost at which it may be made.

The invention embodies other and further advantages and is capable of being put to additional analogous uses, all of which will become more apparent as the description hereinafter proceeds.

A preferred form of embodiment is illustrated by way of exemplification in the accompanying drawings which form part of this application for Letters Patent and in which Figure 1 is a side elevational view of the device in its open position;

Fig. 2 is a front elevational view of the device in its open position;

Fig. 3 is a side elevational view of the device in its folded position; and

Fig. 4 is a front elevational view of the device in its folded position.

The invention comprises essentially a standard which may be generally similar to the usual type of walking stick, a seat member hinged to the standard intermediate the ends of the standard, and seat member supporting means pivoted to the lower end of the standard and movably engaged with guide means on the seat member, so that the seat member and its supporting means may be folded by turning on their respective hinge and pivot against the standard or may be expanded so that the seat member extends outwardly from the standard at an angle and the supporting means bears against the seat member at a point spaced outwardly from the standard to sustain the seat member in supporting the weight of the user.

Referring now to the drawings, the structure includes a standard 1 having any convenient type of handle 2 formed on its upper end and a foot portion 3 provided at its lower end. A seat member 4 of any convenient shape is hinged to a portion of the standard intermediate the ends of the standard. This portion, in common with the foot portion 3 may be appreciably thickened to provide a solid and durable support for the hinge and the stresses imposed on the structure when the weight of a user of the device is supported.

To the thickened portion adjacent the lower end of the standard seat supporting means, preferably in the form of a pair of struts 5, 5, is pivoted. These struts preferably extend outwardly at an angle from the standard 1 and are braced and secured together at their free ends by a tie rod 6. I have found that a convenient means for securing the tie rod, struts and standard together comprises providing a ferrule 7 for the free end of each strut 5, to which ferrule the tie rod 6 is soldered, brazed or otherwise permanently secured, and by providing a ferrule 8 for the lower end of each strut 5, the end of each ferrule 8 being flattened and receiving a pivot pin 9 which passes through a perforation in the thickened lower portion 3 of the standard.

Guide means 10 is carried by the under side of the seat member. This guide means may be provided in any convenient form. For the sake of economy in construction and simplicity I prefer to use the type of guide shown in the drawings which consists of a single heavy wire element bent into a generally rectangular outline having one transverse run 11 securely fixed to the seat member near its free end, and having its opposite transverse run 12 similarly fixed adjacent the opposite end of the seat member and constituting the hinge element for the standard and the seat member. The longitudinal runs 13, 13, depend slightly from the plane of the seat member and constitute guides for projecting ends of the tie rod 6, permitting the tie rod 6 with its attached struts 5, 5, to slide along a limited portion of the seat member.

Hinging of the seat member to the standard by means of the transverse runs 12 of the guide means 10 is accomplished by securing the outer end portions of the run 12 to the seat member and passing the central portion of the run 12 through an eye or loop of sheet metal or the like 14 carried by the standard.

It will be obvious that the tie rod 6 and the ferrules 7 which are virtually integral therewith function to connect the struts 5 to form a triangular frame, which may slide along the guide rails 13 toward and away from the standard 1. The struts preferably extend into the ferrules 7 above the level of the tie rod 6, so that when the supporting frame is extended as shown in Fig. 1, any weight carried by the seat member is directly supported by the struts 5. It will be obvious that movement of the struts 5 toward the standard results in constraining the seat member to move downwardly into folded relation against the standard. It is also to be noted that the device may be transformed from its folded condition shown in Fig. 3 to its expanded condition shown in Fig. 1 by simply holding the standard out horizontally with the seat member down. The weight of the seat member causes it to swing downwardly from the standard, and the tie rod 6 with the connected ends of struts 5, 5, move by their weight downwardly to the end of guide rails 13, 13, so that the structure assumes the position shown in Fig. 1. Folding the device is accomplished by the reverse of the foregoing operation, i. e., by lifting the device upwardly with the extended seat member uppermost until the standard passes through a horizontal position, whereupon the tie rod 6 falls toward the hinged end of guide element 10, and seat member 4 falls by gravity into parallelism with the standard, as shown in Fig. 3.

The parts are so arranged that when fully expanded the seat member makes somewhat less than a right angle with the standard, so that when the device is held, as shown in Fig. 1, with the seat member in a horizontal plane, the standard is inclined forwardly at an acute angle to the ground. It follows that the center of gravity of a person straddling the seat 4 may easily be positioned directly over the lower end 3 of the standard, so that the weight of the person is supported in perfect balance. It is to be noted that the two feet of the user are planted on the ground a short distance in front of the lower end 3 of the standard, while one hand of the user rests on the handle 2 of the standard and steadies the device. It will be apparent that when bearing the weight of a user sitting in the position just explained, the structure comprises virtually a three-legged stool, only one leg, the lower end 3 of the standard, bearing the weight, and the other two legs, the feet of the user, bearing no weight but serving only to maintain the position and consequent balance of the structure.

The structure may be made of any suitable material. I prefer to use wood for the standard, seat member and the struts, while metal stampings and heavy gauge wire are used for the ferrules and guide member 10 respectively. Obviously the standard, seat member and struts may be made wholly of metal, or of bamboo or any other convenient materials. The invention does not reside in the use of any specific materials, but rather in the novel relationship of the structural parts.

I prefer to make the upper surface of the seat member 4 plane to adapt it to bear advertising matter, since it is contemplated that devices made according to the invention may be rented or loaned to the patrons of amusement parks and the like for use by the patrons and return later to the owner of the device.

It is to be understood that the invention has been explained herein in a single preferred form of embodiment only and that this explanation has been only by way of exemplification. The invention is capable of embodiment in other and further modified forms, and all such modifications, to the extent that they embody the principles of the invention as set forth in the appended claims are to be deemed within the scope and purview thereof.

I claim:

1. A combination walking stick and seat comprising a standard in the form of a single stick, a rigid seat member hinged to an intermediate portion of the standard, and a pair of seat member supporting struts having converging ends pivoted at a common point to the lower portion of the standard and having diverging opposite ends secured together and slidably connected to the seat member, the struts being adapted in one position to be folded against the standard and in another position to be angularly extended from the standard to support the free end of the seat member, and the struts being shorter than the length of standard between the seat hinge and the strut pivot, whereby the seat member folds downwardly against the standard when the struts are folded against the standard.

2. A combination walking stick and seat as claimed in claim 1, including spaced parallel guide means carried by the seat member and a tie rod securing the diverging ends of the struts together and extending laterally beyond the struts, the extended ends of the tie rod slidably engaging the guide means.

3. A combination walking stick and seat comprising a standard in the form of a single stick, a rigid seat member hinged to an intermediate portion of the standard, guide rails extending along the underside of the seat member in spaced relation thereto and having end portions secured to the seat member, a pair of seat member supporting struts having converging ends pivoted at a common point to the lower portion of the standard and having diverging opposite ends, a tie rod securing the diverging ends together, and means extending from the struts laterally outwardly from their diverging ends slidably received in the space between the seat member and the guide rails, whereby the struts may be moved as a unit against the standard to fold the structure and extended angularly therefrom to support the free end of the seat member, the struts being shorter than the length of standard between the seat hinge and the strut pivot, whereby the seat member folds downwardly against the standard when the struts are folded against the standard.

4. A combined walking stick and seat comprising a standard, a rigid seat member hinged to an intermediate portion of the standard, a pair of seat member supporting struts having converging ends pivoted at a common point to the lower portion of the standard and having diverging opposite ends, a tie rod securing the diverging ends together, and a unitary strip of material of substantially rectangular outline secured to the under side of the seat member having substantially parallel side portions spaced apart and spaced from the seat member constituting guideways slidably receiving the tie rod and having an end portion connecting the side portions and constituting the pin of the hinge by which the seat member is hinged to the standard.

5. A combination walking stick and seat comprising a standard in the form of a single stick, a rigid seat member hinged to an intermediate portion of the standard, and a pair of seat member supporting struts having converging ends pivoted at a common point to the lower portion of the standard and having diverging opposite ends secured fixedly together and slidably connected as a unit to the seat member, the struts being shorter than the length of standard between the seat hinge and the strut pivot, whereby the seat member folds downwardly against the standard when the struts are folded against the standard, and whereby the seat member extends from the standard and is supported at three points, comprising the hinge point and the end of each strut, when the struts are angularly extended from the standard.

ALBERT JAY SHELDON.